US00RE40773E

(19) United States
(12) Reissued Patent
Hashimoto

(10) Patent Number: US RE40,773 E
(45) Date of Reissued Patent: Jun. 23, 2009

(54) DRIVE CIRCUIT FOR DRIVING AN IMAGE DISPLAY UNIT

(75) Inventor: Yoshiharu Hashimoto, Tokyo (JP)

(73) Assignee: NEC Electronics Corporation, Kawasaki, Kanagawa (JP)

(21) Appl. No.: 11/133,483

(22) Filed: May 20, 2005

Related U.S. Patent Documents

Reissue of:
(64) Patent No.: 6,570,560
Issued: May 27, 2003
Appl. No.: 09/884,942
Filed: Jun. 21, 2001

(30) Foreign Application Priority Data

Jun. 28, 2000 (JP) ..... 2000-194457

(51) Int. Cl.
*G09G 5/00* (2006.01)

(52) U.S. Cl. ..... 345/211; 345/89; 345/212; 345/690

(58) Field of Classification Search ..... 345/87–103, 345/204–213, 690
See application file for complete search history.

(56) References Cited

U.S. PATENT DOCUMENTS 5,196,738 A * 3/1993 Takahara et al. ..... 327/530
5,250,937 A * 10/1993 Kikuo et al. ..... 345/89
6,107,981 A * 8/2000 Fujita ..... 345/95
6,437,765 B1 * 8/2002 Kasai et al. ..... 345/89
6,570,560 B2 * 5/2003 Hashimoto ..... 345/211

FOREIGN PATENT DOCUMENTS

JP 5-158446 6/1993
JP 7-104716 4/1995

OTHER PUBLICATIONS

Korean Office Action with Japanese Translation and Partial English Translation.
Saito and Kitamura, "17.3: A 6–bit Digital Data Driver for Color TFT–LCDs", Society for Information Display (SID) International Symposium digest of technical papers, vol. XXVI, pp. 257–260 (1995).*

* cited by examiner

*Primary Examiner*—Vijay Shankar
(74) *Attorney, Agent, or Firm*—McGinn IP Law Group, PLLC

(57) ABSTRACT

A drive circuit has a judgement circuit for judging whether the magnitude of the input video data resides in a linear region or the non-linear region of characteristic of liquid crystal transmittance. When the vide data resides within the linear region, some of the output gray-scale voltage for the LCD are generated by interpolation of adjacent two of the gray-scale voltages generated by a voltage generator. The reduced gray-scale voltage taps reduces the circuit scale and the test procedures for the drive circuit.

13 Claims, 12 Drawing Sheets

FIG. 8

| VIDEO DATA | $V_{OUT}$ |
|---|---|
| 00000000 | V0 |
| 00000001 | V1 |
| 00000010 | V2 |
| 00000011 | V3 |
| ⋮ | |
| 00011110 | V30 |
| 00011111 | V31 |
| 00100000 | V32 |
| 00100001 | V32+ α |
| 00100010 | V34 |
| 00100011 | V34+ α |
| ⋮ | |
| 11011110 | V222 |
| 11011111 | V222+ α |
| 11100000 | V224 |
| 11100001 | V225 |
| ⋮ | |
| 11111110 | V254 |
| 11111111 | V255 |

FIG. 12

| VIDEO DATA | $V_{OUT}$ |
|---|---|
| 00000000 | V0 |
| 00000001 | V1 |
| 00000010 | V2 |
| 00000011 | V3 |
| ⋮ | |
| 00011110 | V30 |
| 00011111 | V31 |
| 00100000 | V32 |
| 00100001 | (3/4)V32+(1/4)V36 |
| 00100010 | (2/4)V32+(2/4)V36 |
| 00100011 | (1/4)V32+(3/4)V36 |
| 00100100 | V36 |
| ⋮ | |
| 11011100 | V220 |
| 11011101 | (3/4)V220+(1/4)V224 |
| 11011110 | (2/4)V220+(2/4)V224 |
| 11101111 | (1/4)V220+(3/4)V224 |
| 11100000 | V224 |
| 11100001 | V225 |
| ⋮ | |
| 11111110 | V254 |
| 11111111 | V255 |

DRIVE CIRCUIT FOR DRIVING AN IMAGE DISPLAY UNIT

Matter enclosed in heavy brackets [ ] appears in the original patent but forms no part of this reissue specification; matter printed in italics indicates the additions made by reissue.

BACKGROUND OF THE INVENTION (a) Field of the Invention

The present invention relates to a drive circuit for an image display unit and, more particularly, to a drive circuit for driving an image display unit to display thereon multi-level gray-scale digital video data. The present invention also relates to a method for operating such a drive circuit.

(b) Description of the Prior Art

FIG. 1 illustrates the configuration of a conventional drive circuit for use in an image display unit such as a liquid crystal display (LCD) unit. This drive circuit is used for displaying digital video data of 240 pixels each having six bits, or data of 240 pixels by 6 bits/pixel.

The drive circuit of FIG. 1 includes an 80-bit shift register 901, a data register block 902, a data latch block 903, a gray-scale voltage selector block 904, an output amplifier block 905, and a gray-scale voltage generator 906. Power source voltages VDD1 and VSS1 are supplied to the 80-bit shift register 901, the data register block 902, and the data latch block 903, while power source voltages VDD2 and VSS2 are supplied to the gray-scale voltage selector block 904, and the output amplifier block 905.

The 80-bit shift register 901 shifts an input pulse in the direction specified by an R/L signal at each cycle of the clock (CLK) signal. More specifically, if the R/L signal indicates the right direction, an STHR signal supplied at the leftmost end of the 80-bit shift register 901 is shifted at each cycle of the CLK signal to output the resulting signal to the data register block 902 as an STHL signal after 80 cycles of the CLK signal. Since the STHR signal includes a single pulse having a width of one clock pulse, pulses are output successively through terminals C1, C2, . . . C79, and C80 of the shift register 901 while the STHR signal is being shifted. On the other hand, if the R/L signal indicates the left direction, an STHL signal supplied at the rightmost end of the shift register 901 is shifted at each cycle of the CLK signal to output the resulting signal to the data register block 902 as an STHR signal after 80 cycles of the CLK signal. Since the STHL signal includes also a single pulse having a width of one clock, pulses are output successively through terminals C80, C79, . . . C2, and C1 of the shift register 901 while the STHL signal is being shifted.

The data register block 902 has a storage capacity of 1440 bits or a storage capacity for 240 pixels, receives video data D00–D25 for three pixels each including 6 bits in parallel at each cycle of the CLK signal, and successively stores video data in the data register block 902. That is, the video data input to the data register block 902 is successively stored in the data registers of the data register block 902 through terminals C1, C2, . . . C79, and C80.

The data latch block 903 latches the 240-pixel video data supplied from the data register block 902 at once when a LATCH signal is active. The data latch block 903 has a capacity of 240-pixel data, and is provided because, while the amplifier block 905 is outputting the video data for one line, the next video data for another line is input to the data register block 902.

The gray-scale voltage generator 906 is configured as shown in FIG. 2, receiving specific gray-scale voltages V0 to V8, providing gray-scale voltage at eight tap points of a resistor ladder or resister string which divides each adjacent two of the specific gray-scale voltages V0 to V8, and outputting intermediate gray-scale voltages through the tap points of the resistor ladder in association with the specific gray-scale voltages V0 to V8. Accordingly, the gray-scale voltage generator 906 outputs 64 voltage levels. By using a nonlinear adjustment of the levels of the gray-scale voltages V0–V8 in accordance with the characteristics of the LCD unit to be driven, a nonlinear correction can be obtained for the characteristics of the LCD unit with respect to the relation between the voltage and the percent transmission, such as shown in FIG. 3.

Referring to FIG. 4, the gray-scale voltage selector block 904 includes a decoder 904-1 and switches 904-2 for each pixel, the number of switches being equal to the number of gray scale levels to be displayed. The gray-scale voltage selector block 904 selects one voltage out of the 64 voltages, supplied from the gray-scale voltage generator 906, for the video data of each of the 240 pixels output from the data latch block 903 in accordance with the value of the 6 bits of video data, to output the resulting voltage as an analog signal.

The amplifier block 905 outputs the analog signal of the 240 pixels. These analog signals act as pixel signals of a single line selected by a vertical scan circuit (not shown). In addition, since a plurality of drive circuits for displaying the digital video data are arranged in the horizontal direction, all the pixel signals of the single line are made available simultaneously.

The scheme employed by the drive circuit for displaying digital video data is generally referred to as the "resistor string method". This drive circuit is described in Saito and Kitamura, "Society for Information Display (SID) International Symposium digest of technical papers", Vol. XXVI, pp.257–260 (1995). It is to be noted that each gray-scale voltage generator, disposed for a single pixel in the gray-scale voltage selector block 904 described in the literature, includes an enhancement transistor and a depletion transistor, as shown in FIG. 5, and disuses a transistor that is considered necessary to constitute the switch 904-2 shown in FIG. 4.

In the conventional resistor string method described above, although a 6-bit (64-level gray scale) drive circuit can be implemented without a significant problem, an attempt to realize gray-scale levels higher than 64 levels may cause the following problems.

A first problem is that employing a semiconductor integrated circuit implementing the drive circuit may cause the chip to significantly increase in size. This is because, among others, the number of gray-scale voltage selectors employed in the resistor string method is doubled and doubled as the level of gray scale increases bit by bit. For example, a 64-level gray-scale drive circuit requires 64 gray-scale voltage selectors per one output, whereas a 256-level gray-scale drive circuit requires 256 gray-scale voltage selectors, four times as many as those of the 64-level gray-scale drive circuit. This causes the die area to increase, leading to an increased in its size.

A second problem is that longer time may be required for testing the semiconductor integrated circuit after it is fabricated. The 64-level gray-scale drive circuit has 64 gray-scale voltage selectors per one output, and it is necessary to check the function of all the voltage selectors. Similarly, in the 256-level gray-scale drive circuit, it is necessary to check the function of all the 256 voltage selectors per one output. This may cause the testing time to increase four times, leading to an increase in testing cost.

SUMMARY OF THE INVENTION

It is therefore an object of the present invention to provide a drive circuit for driving an image display unit, such as a TFT (Thin Film Transistor) LCD unit, to display thereon multi-level gray-scale digital video data, especially such as having gray-scale levels of digital video data higher than eight bits per pixel, to realize reduction of the circuit scale, the die area, and the cost for testing the drive circuit.

The present invention provides a drive circuit for driving a display unit including: a gray-scale level voltage generator for generating a plurality of gray-scale level voltages, the gray-scale voltages corresponding to magnitudes of possible video data in one-to-one correspondence in a non-linear region of characteristic of liquid crystal transmittance and corresponding to magnitudes of possible video data in one-to-n correspondence in a linear region of characteristic of liquid crystal transmittance where n is an integer larger than one; a gray-scale voltage selector block for responding to input video data to select one of the gray-scale level voltages; a judgement section for judging whether a magnitude of an input video data resides within the non-linear region or the linear region to output a judgement signal indicating the non-linear region or the linear region; and an output circuit for responding to the judgement signal to output the one of the gray-scale level voltages selected by the gray-scale voltage selector block when the judgement signal indicates the non-linear region and output one of the gray-scale voltages or an intermediate voltage when the judgement signal indicates the linear region, the intermediate voltage residing between two of adjacent gray-scale voltages.

In accordance with the drive circuit of the present invention, use of the intermediate voltage between adjacent two of the gray-scale voltages in the linear region reduces the number of gray-scale voltages to be generated substantially without degrading the image quality of the image display unit to be drive by the drive circuit, and reduces the circuit scale of the drive unit and reduces the test procedures for the drive circuit. The intermediate voltage may be preferably obtained by interpolation of the adjacent two of the gray-scale voltages.

The above and other objects, features and advantages of the present invention will be more apparent from the following description, referring to the accompanying drawings.

BRIEF DESCRIPTION OF THE DRAWINGS

FIG. 8 is a table showing the relationship between the output voltage and the video data to be received by the drive circuit for displaying multi-level gray-sale digital video data according to the first embodiment of the present invention;

FIG. 12 is a table showing the relationship between the output voltage and the video data to be received by the drive circuit for displaying multi-level gray-scale digital video data according to the second embodiment of the present invention;

DETAILED DESCRIPTION OF THE PREFERRED EMBODIMENTS

Figure 1:
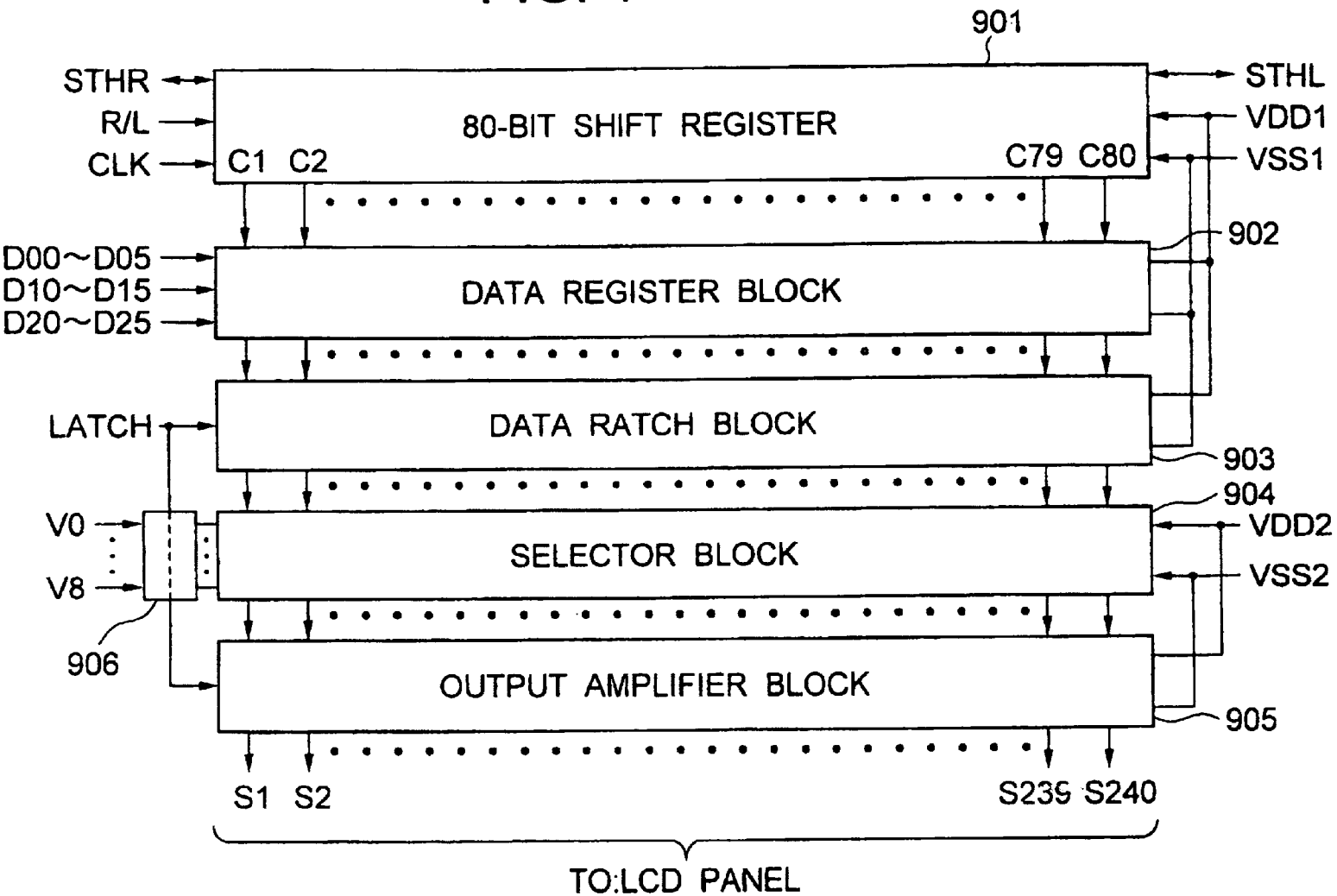
FIG. 1 PRIOR ART
FIG. 1 is a block diagram illustrating the configuration of a conventional drive circuit for displaying multi-level gray-scale digital video data.

Now, the present invention will be described below in more detail with reference to the accompanying drawings in accordance with the preferred embodiments. It is to be noted that similar constitute elements are designated by similar reference numerals or related reference numerals throughout the drawings.

[First Embodiment]

Figure 6:
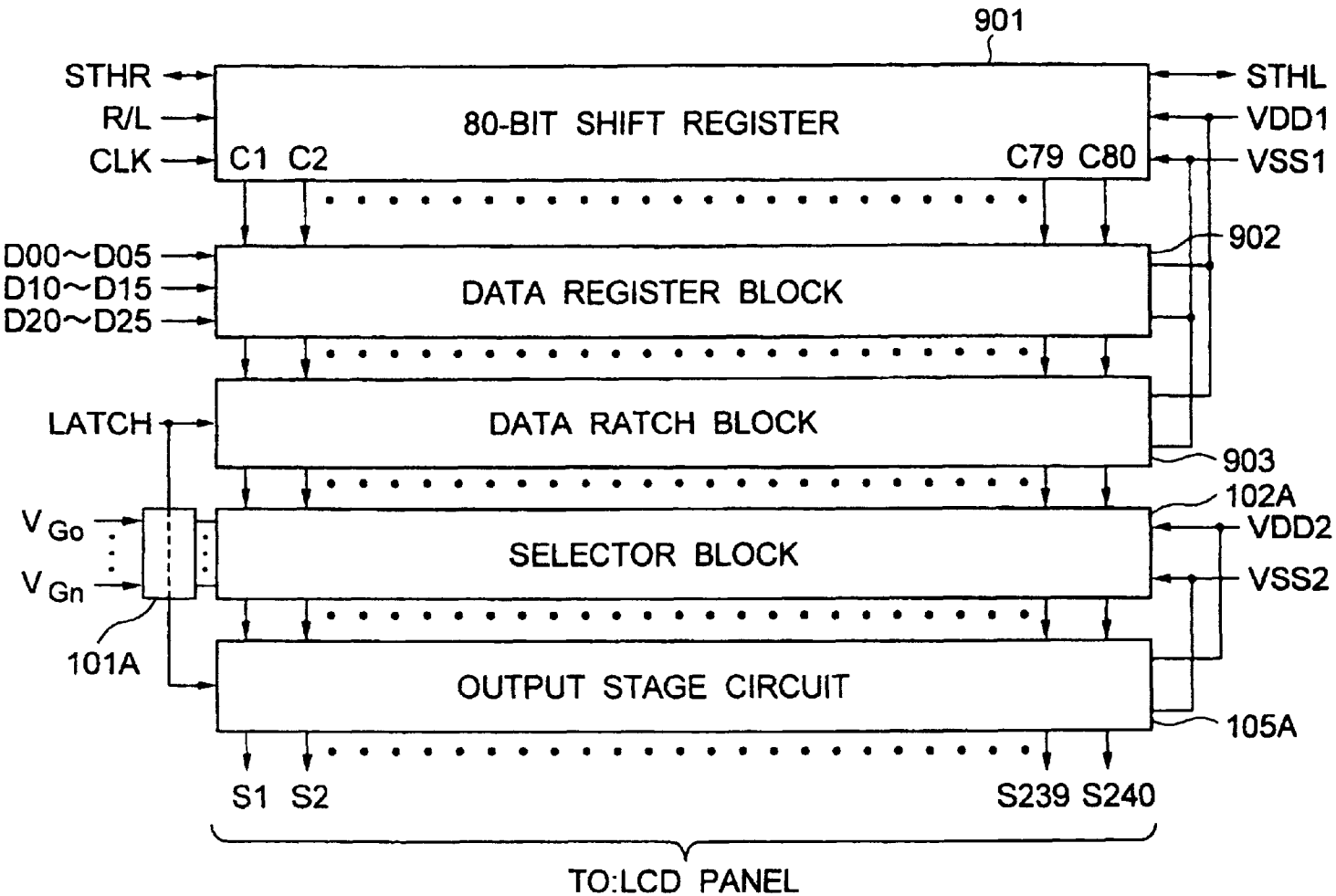
FIG. 6 is a block diagram illustrating a drive circuit for driving a LCD unit to display thereon multi-level gray-scale digital video data according to a first embodiment of the present invention.

FIG. 6 illustrates the configuration of a drive circuit according to the first embodiment of the present invention. The drive circuit of the present embodiment includes an 80-bit shift register 901, a data register block 902, and a data latch block 903, which are similar to those in the conventional drive circuit of FIG. 1. The drive circuit also includes a gray-scale voltage generator 101A, a gray-scale voltage selector block 102A, and an output stage circuit 105A. The gray-scale voltage generator 101A has a circuit configuration which is similar to the circuit configuration of the gray-scale voltage generator 906 shown in FIG. 2. The gray-scale voltage selector block 102A includes a group of 240 gray-scale voltage selectors each having a configuration similar to that shown in FIG. 4.

Figure 7:
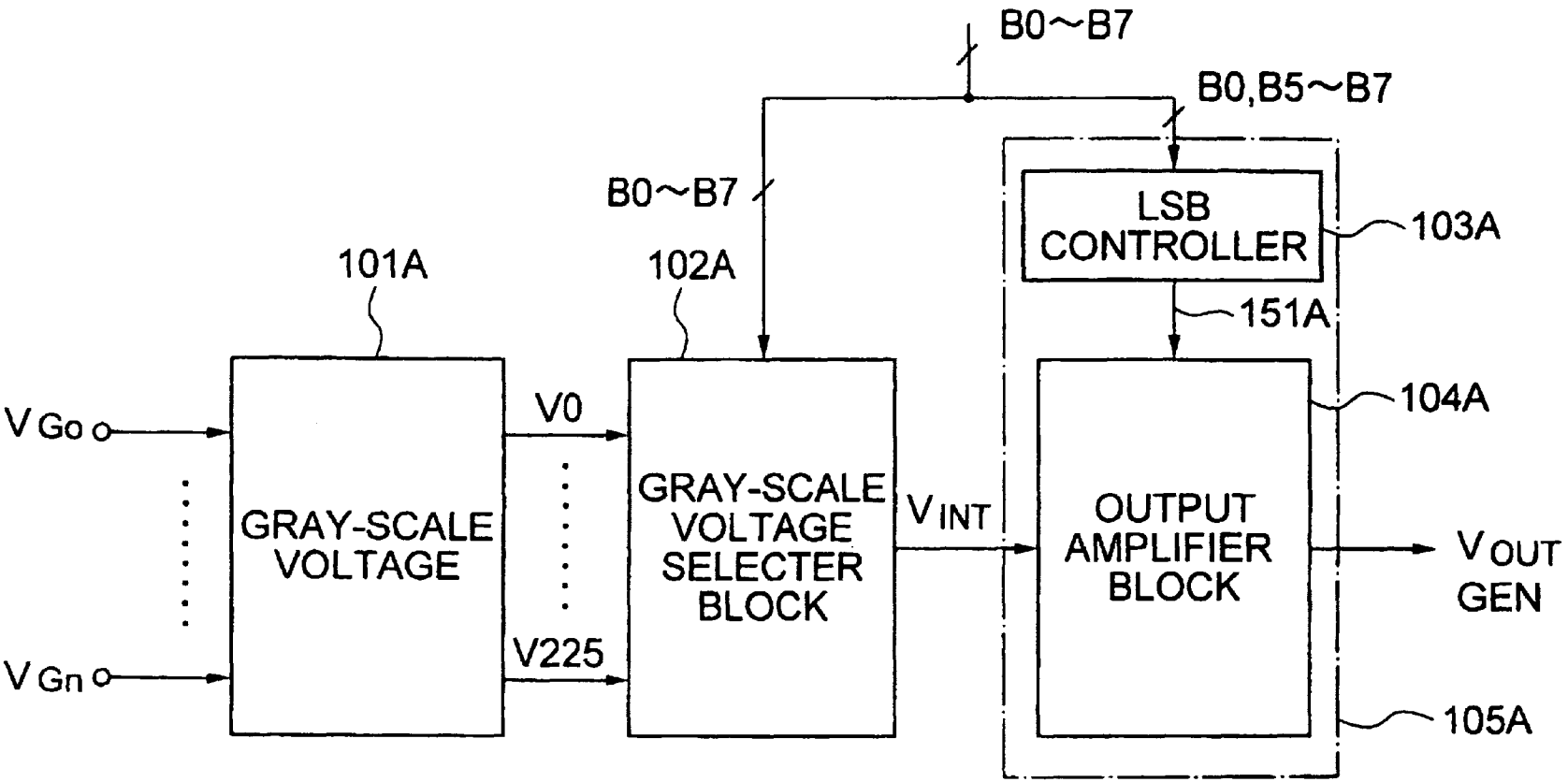
FIG. 7 is a block diagram of the main portion of the drive circuit of FIG. 6.

The output stage circuit 105A includes an amplifier block 104A and a least-significant-bit (LSB) controller 103A, as shown in FIG. 7. The least-significant-bit controller 103A acts as a judgement section which judges whether the magnitude of the video data resides within a non-linear region or a linear region. The output stage amplifier block 104A is somewhat different from the amplifier block 905 shown in FIG. 1.

The gray-scale voltage generator 101A divides input gray-scale reference voltages (VG0 to VGn). In general, to display 64 levels of gray scale data solely by means of the gray-scale voltage selector block 102A, the selector block 102A is provided with 63 resistors to generate 64 distinct voltages. Similarly, to display 256 levels of gray scale data solely by means of the gray-scale voltage selector block 102A, the selector block 102A is generally provided with 255 resistors to generate 256 distinct voltages.

In the present embodiment, however, the gray-scale voltage generator 101A is provided with 159 resistors to generate 160 gray-scale voltages for displaying 256 gray-scale levels on the LCD panel. That is, the gray-scale voltage generator 101A generates 64 gray-scale voltages V0, V1, V2, . . . V30, V31, V224, V225, V226, . . . V254, and V255 with an 8-bit accuracy in the nonlinear region of characteristic of liquid crystal transmittance with respect to applied voltage. On the other hand, in the linear region of characteristic of liquid crystal transmittance with respect to applied voltage, the gray-scale voltage generator 101A generates 96 gray-scale voltages, V32, V34, . . . V220, and V222 with a 7-bit accuracy. Therefore, the gray-scale voltage generator 101A generates 160 different gray-scale voltages in total to output the voltages to the gray-scale voltage selector block 102A.

The gray-scale voltage selector block 102A is configured similarly to the gray-scale voltage selector block in the conventional drive circuit of FIG. 1. As shown in FIG. 8, in accordance with the values of all of the bits B0–B7 of the digital video data, the gray-scale voltage selector block 102A also selects, as a voltage $V_{INT}$, one voltage from the 160 gray-scale voltages that are input from the gray-scale voltage generator 101A. For the magnitudes of digital video data residing within the range of 0 to 31, voltages V0, V1, V2, . . . and V31 are selected as voltage $V_{INT}$. For the magnitudes of digital video data residing within the range of 32 to 223, voltages V32, V34, V36, . . . and V222 are selected as voltage $V_{INT}$. For the magnitudes of digital video data residing within the range of 224 to 255, voltages V224, V225, V226, . . . and V255 are selected as output voltages $V_{INT}$.

In accordance with the value of a control signal 151A input from the least-significant-bit controller 103A, the output stage amplifier block 104A selects and outputs, as an output voltage $V_{OUT}$, the voltage $V_{INT}$ input from the gray-scale voltage selector block 102A or the voltage $V_{INT}$ added by an offset voltage α, as detailed below.

Figure 9:
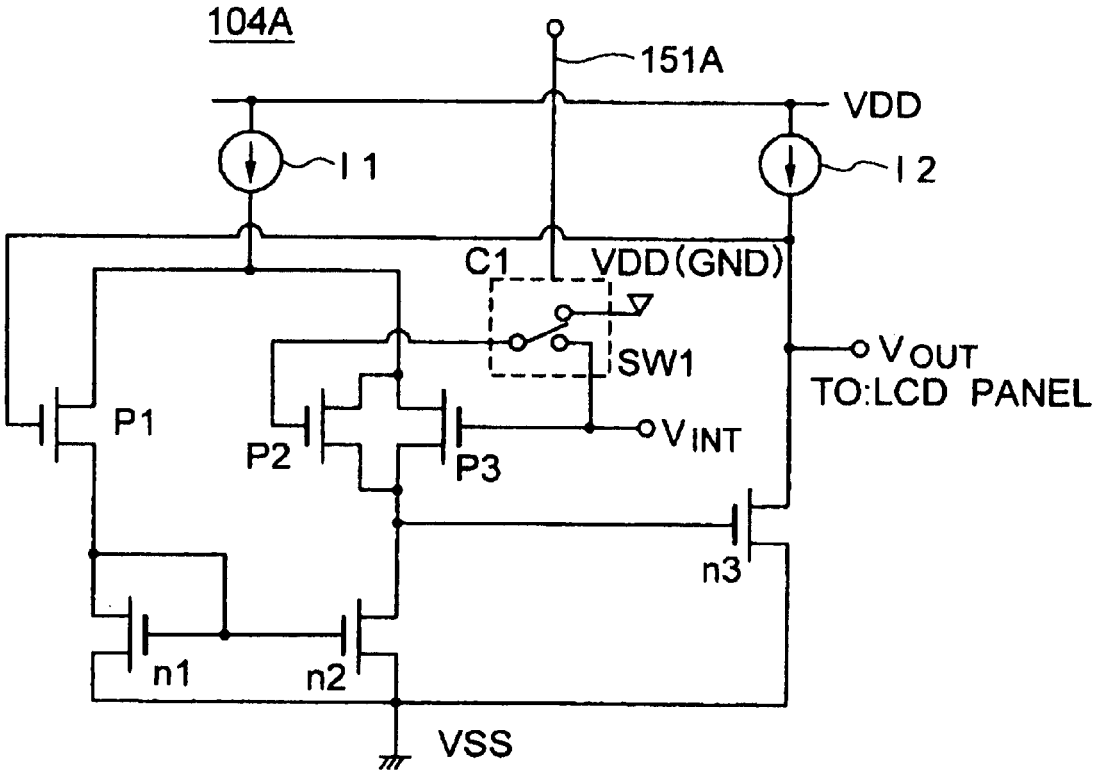
FIG. 9 is a block diagram illustrating the configuration of the output stage amplifier block 104A shown in FIG. 7.

An output amplifier in the output stage amplifier block 104A is configured as shown in FIG. 9. The output amplifier has the configuration of a voltage follower modified for controlling the output voltage $V_{OUT}$ depending on the output signal 151A from the least-significant-bit controller 103A. More specifically, the output amplifier includes a pair of current sources for generating constant currents I1 and I2, a pair of p-ch transistors P1 and P2 acting as a differential pair at a specified situation, a pair of n-ch transistors N1 and N2 forming a current mirror, a p-ch transistor connected in parallel with the p-ch transistor P3, and an n-ch transistor having a gate connected to the drain of the p-ch transistors P2 and P3, a source connected to the gate of the p-ch transistor P1 and a drain connected to the ground. The gate of p-ch transistor P3 is connected to the output $V_{INT}$ of the gray-scale voltage selector 102A. The gate of p-ch transistor P2 is connected to either the VDD line or the output $V_{INT}$ of the gray-scale voltage selector 102A through the switch SW1 depending on the output 151A of the least-significant-bit controller 103A. The p-ch transistor P2 has a significantly smaller dimension compared to the p-ch transistor P3.

With p-ch transistor P2 and the switch SW1 being neglected, the output amplifier acts as a voltage follower, which allows the output voltage $V_{OUT}$ to follow the input voltage $V_{INT}$ of the output amplifier. This state is achieved by connecting the gate of p-ch transistor to the VDD line by the switch SW1. When the gate of p-ch transistor P2 is connected to the output $V_{INT}$ of the gray-scale voltage selector 102A, the differential pair has some unbalance therebetween in the ON-current and allows the output voltage $V_{OUT}$ to exceed the $V_{INT}$ by a specified minute voltage or the offset voltage α. The magnitude of α is determined at a half of the difference between adjacent two of the gray-scale voltages.

If the differential pair are implemented by n-ch transistors, the gate of the parallel transistor is maintained at the ground potential or the output $V_{INT}$ of the gray-sale voltage selector 102A by the switch SW1.

Figure 10:
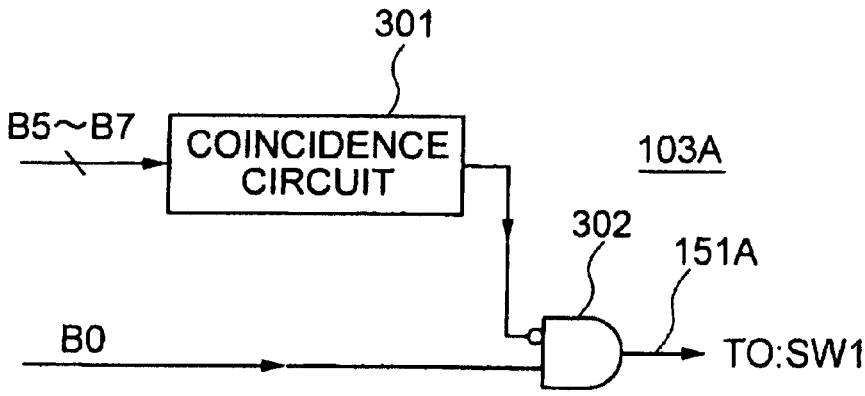
FIG. 10 is a block diagram illustrating the configuration of the least-significant-bit controller 103A shown in FIG. 7.

Referring to FIG. 10, the least-significant-bit controller 103A includes a coincidence circuit 301 and an AND gate 302. As can be seen clearly from FIG. 10, when all of the three significant bits B5–B7 of video data assume "0" or "1", the coincidence circuit 301 outputs a high level and the least significant bit B0 is disabled, thereby allowing the AND gate 302 to output a low level control signal 151A. On the other hand, when any one of the three significant bits B5–B7 of the video data assumes a value different from those of other two significant bits, the coincidence circuit 301 outputs a low level signal, and thus the AND gate 302 outputs a low level or a high level control signal 151A depending on the least significant bit B0. The switch SW1 couples the gate of p-ch transistor to the output $V_{INT}$ of the gray-scale voltage selector 102A when the control signal 151A assumes a low level, whereas coupled to the VDD line when the control signal 151A assumes a high level.

Therefore, as shown in FIG. 8, the value of the output voltage $V_{OUT}$ that is provided by the output stage amplifier block 104A varies depending on the magnitude of the video data. More specifically, for the magnitude of digital video data residing within the range of 0 to 31, the output voltage $V_{OUT}$ assumes V0, V1, V2, . . . and V31. For the magnitude of digital video data residing within the range of 32 to 223, the output voltage $V_{OUT}$ assumes V32, V32+α, V34, V34+α, . . . V222, V222+α. For the magnitude of digital video data residing within the range of 224 to 255, the output voltage $V_{OUT}$ assumes V224, V225, V226, . . . and V255. It is to be noted that the value of the offset voltage α is determined about one half the difference between the voltages of V126 and V128, for example, of a typical LCD panel by adjusting the size of the p-ch transistor P2, the gate of which is coupled to the $V_{INT}$ or VDD through the switch SW1, and the p-ch transistor P3 paired therewith. As a concrete example, the offset voltage α is set within the rage from 5 mV to 10 mV.

Of the voltages to be output by the gray-scale voltage generator 101A, the voltages to be output in the nonlinear region may be changed from V32, V34, . . . and V222 to V33, V35, . . . and V223. In this case, the least-significant-bit controller 103A should be configured differently to supply a different voltage through the switch SW1. This may allow the output stage amplifier block 104A to be adapted such that the voltage $V_{INT}$ input from the gray-scale voltage selector block 102A remains unchanged as the output voltage $V_{OUT}$ for the magnitude of digital video data of 33, 35, . . . and 223. In addition, the output stage amplifier block 104A may be adapted such that the voltage $V_{INT}$, input from the gray-scale voltage selector block 102A, subtracted by the offset voltage is output as the output voltage $V_{OUT}$ for the magnitude of digital video data of 32, 34, . . . and 222.

[Second Embodiment]

Figure 11:
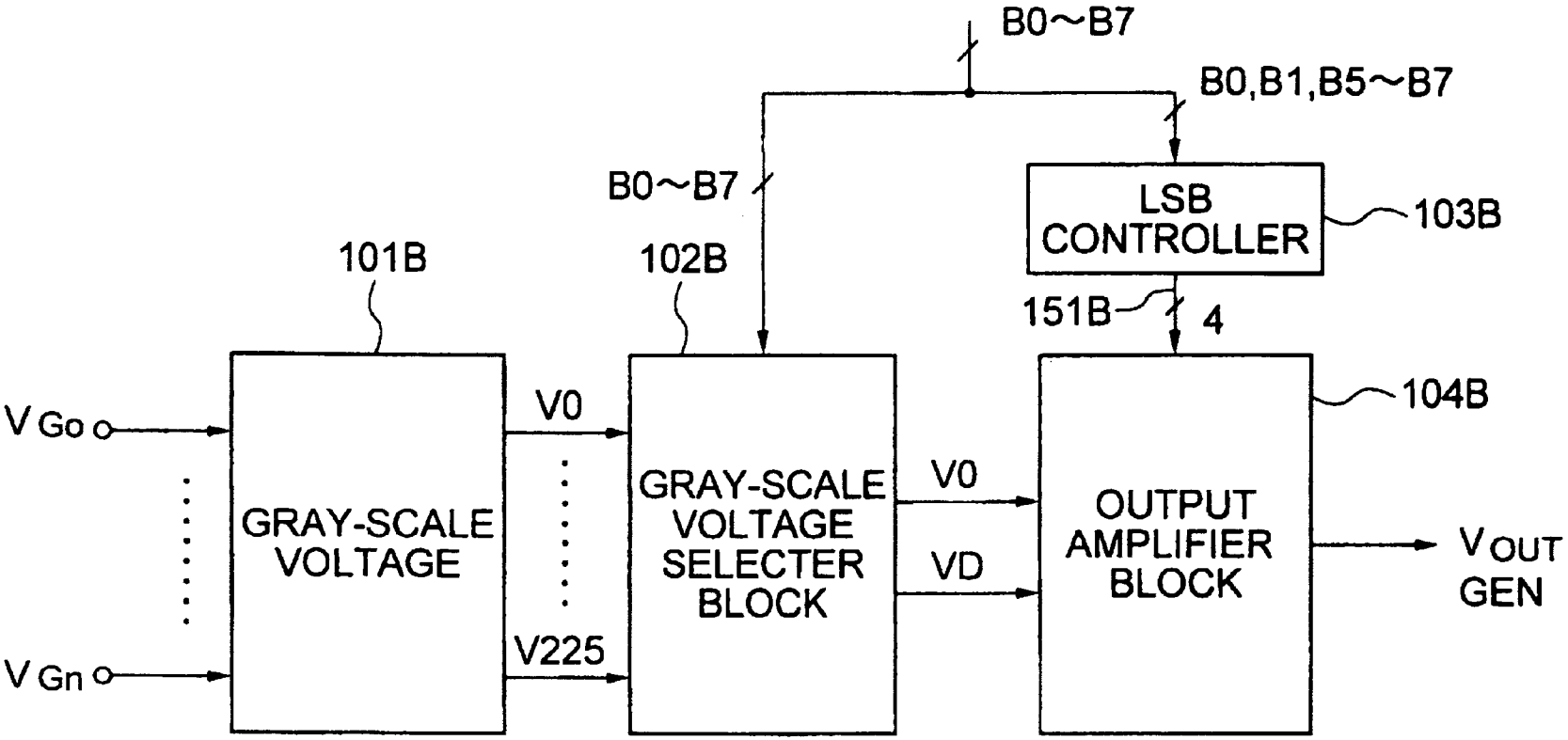
FIG. 11 is a block diagram illustrating the main portion of a drive circuit for displaying multi-level gray-scale digital video data according to a second embodiment of the present invention.

Referring to FIG. 11, there is shown the configuration of the main portion of a drive circuit according to a second embodiment of the present invention. The overall configuration is similar to that shown in FIG. 6. A gray-scale voltage generator 101B is similar to the gray-scale voltage generator 906. A group of 240 gray-scale voltage selectors 102B constitutes the gray-scale voltage selector block. A least-significant-bit controller 103B is included in the second embodiment. A group of 240 output stage amplifiers constituents the output stage amplifier block 104B. The output stage amplifier block 104B has a configuration similar to that the output amplifier block 905 shown in FIG. 1 added by resistors and switches.

Figure 2:
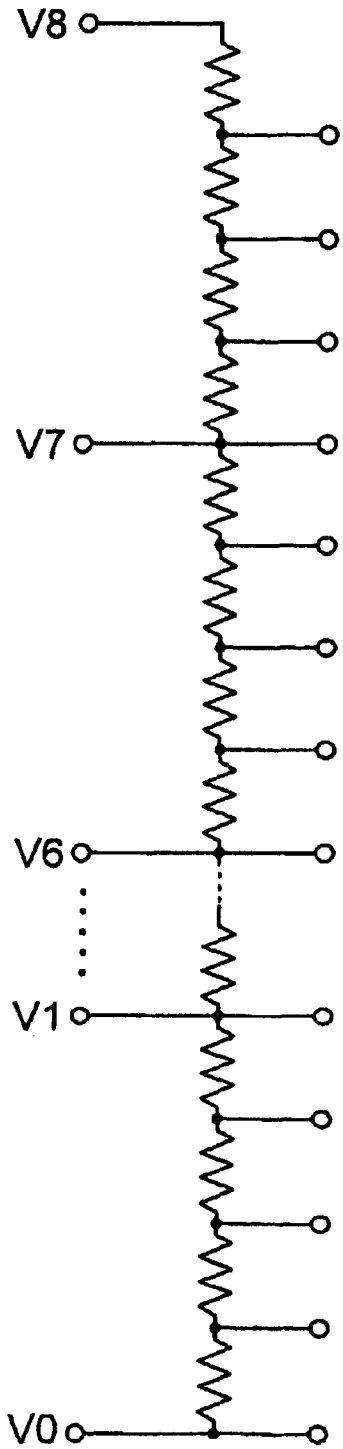
FIG. 2 PRIOR ART
FIG. 2 is a circuit diagram illustrating the configuration of a gray-scale voltage generator shown in FIG. 1.
Figure 3:
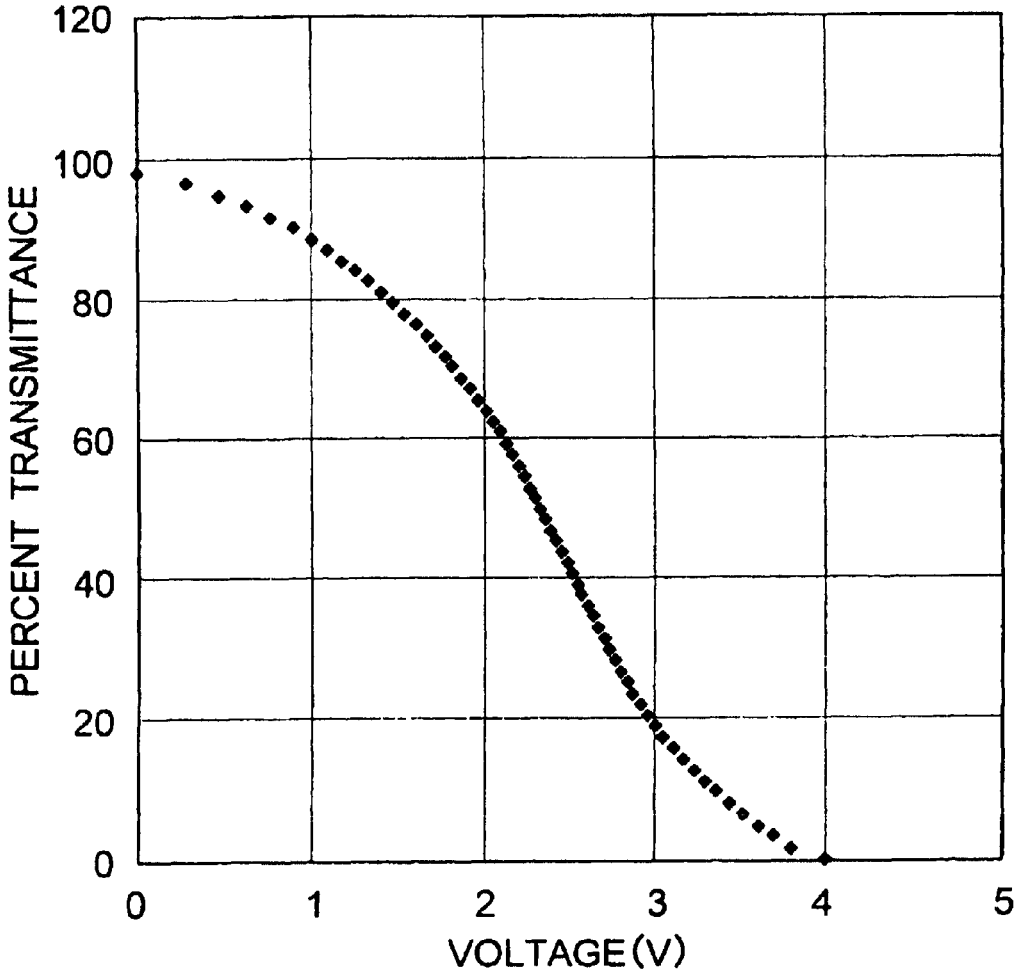
FIG. 3 PRIOR ART
FIG. 3 is a graph of a LCD unit showing the relationship between the gray-scale voltage and the optical transmittance of the LCD obtained thereby.

The gray-scale voltage generator 101B is configured similarly to that shown in FIG. 2 and divides input gray-scale reference voltages (VG0 to VGn). In general, to display 64 levels of gray scale data solely by means of the gray-scale voltage selector 102B, the selector block 102B is provided with 63 resistors to generate 64 distinct voltages. Similarly, to display 256 levels of gray scale data solely by means of the gray-scale voltage selector 102B, the selector block 102B is provided with 255 resistors to generator 256 distinct voltages.

In the present embodiment, however, the gray-scale voltage generator 101 B is provided with 111 resistors to generate 112 voltages. More specifically, the gray-scale voltage generator 101B generates 64 gray-scale voltages V0, V1, V2, . . . V30, V31, V224, V225, V226, . . . V254, and V255 with an 8-bit accuracy in the nonlinear region of characteristic of liquid crystal transmittance with respect to applied voltage. On the other hand, in the linear region of characteristic of liquid crystal transmittance with respect to applied voltage, the gray-scale voltage generator 101B generates 48 gray-scale voltages V32, V36, . . . V216, and V220 with a 6-bit accuracy. Therefore, the gray-scale voltage generator 101B generates 112 different gray-scale voltages in total to output the voltages to the gray-scale voltage selector block 102B.

Figure 4:
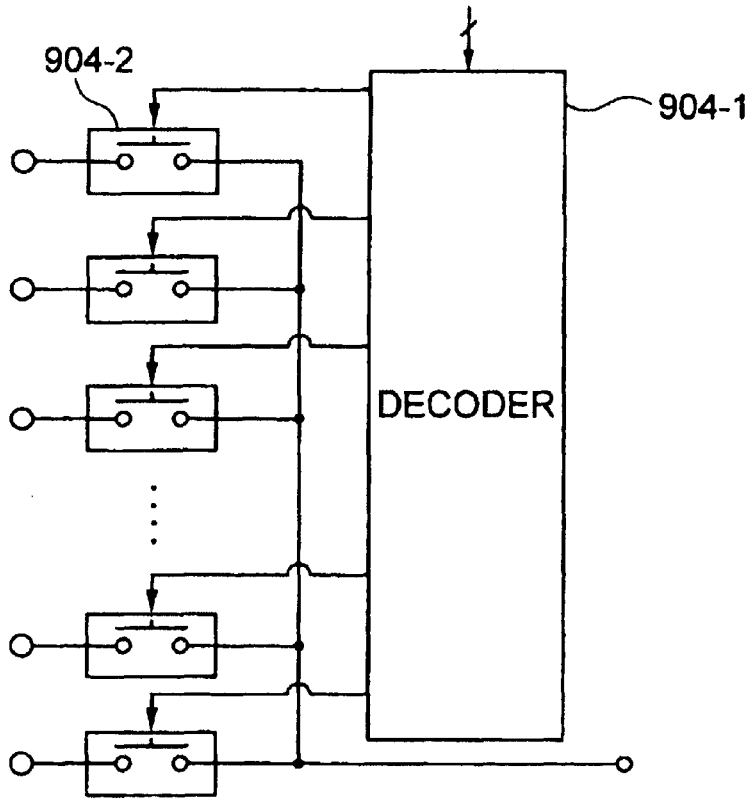
FIG. 4 PRIOR ART
FIG. 4 is a block diagram illustrating the configuration of an example of a gray-scale voltage selector block shown in FIG. 1.
Figure 5:
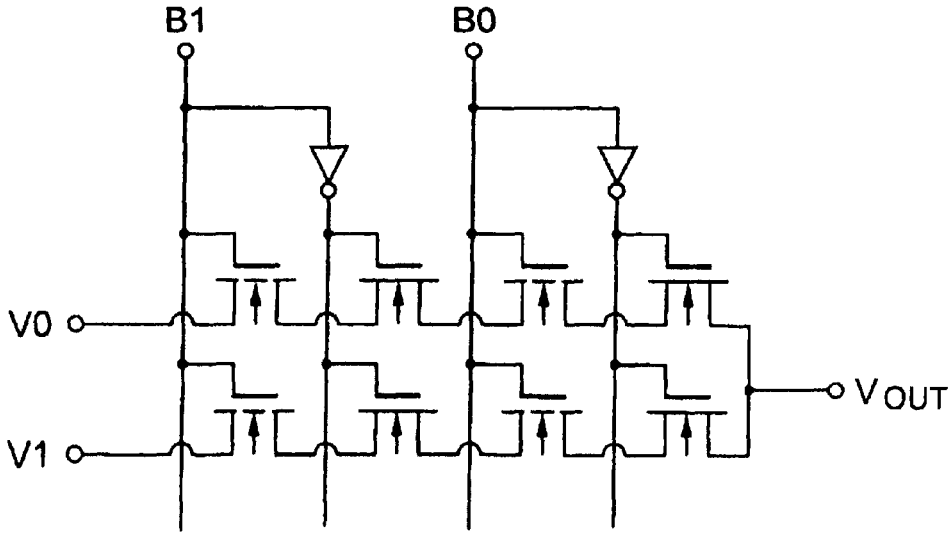
FIG. 5 PRIOR ART
FIG. 5 is a block diagram illustrating the configuration of another example of a gray-scale voltage selector block shown in FIG. 1.

The gray-scale voltage selector block 102B is configured similarly to a combination of two of the conventional gray-sale voltage selector block shown in FIGS. 4 and 5. As shown in FIG. 12, in accordance with the values of all of the bits B0–B7 of the digital video data, the gray-scale voltage selector block 102B also selects, as voltages $V_U$, $V_D$, two adjacent voltages from the 112 gray-scale voltages that are input from the gray-scale voltage generator 101B. More specifically, for the magnitude of digital video data residing within the range of 0 to 31, voltages V0, V1, V2, . . . and V31 are selected as voltage $V_D$. For the magnitude of digital video data residing within the range of 32 to 223, voltages V32, V36, V40, . . . and V220 are selected as voltage $V_D$. For the magnitude of digital video data residing within the range of 224 to 255, voltages V224, V225, V226, . . . and V255 are selected as voltage $V_D$. Furthermore, for the magnitude of digital video data residing within the range of 0 to 31, voltages V1, V2, V3, . . . and V32 are selected as voltage $V_U$. For the magnitude of digital video data residing within the range of 32 to 223, voltages V36, V40, V44, . . . and V224 are selected as voltage $V_U$. For the magnitude of digital video data residing within the range of 224 to 255, voltages V225, V226, V227, . . . and V255 are selected as voltage $V_D$.

In accordance with the value of a control signal 151B input from the least-significant-bit controller 103B, the output stage amplifier block 104B outputs, as output voltage $V_{OUT}$, the voltage generated in accordance with the voltages $V_U$, $V_D$ are input from the gray-scale voltage selector block 102B.

Figure 13:
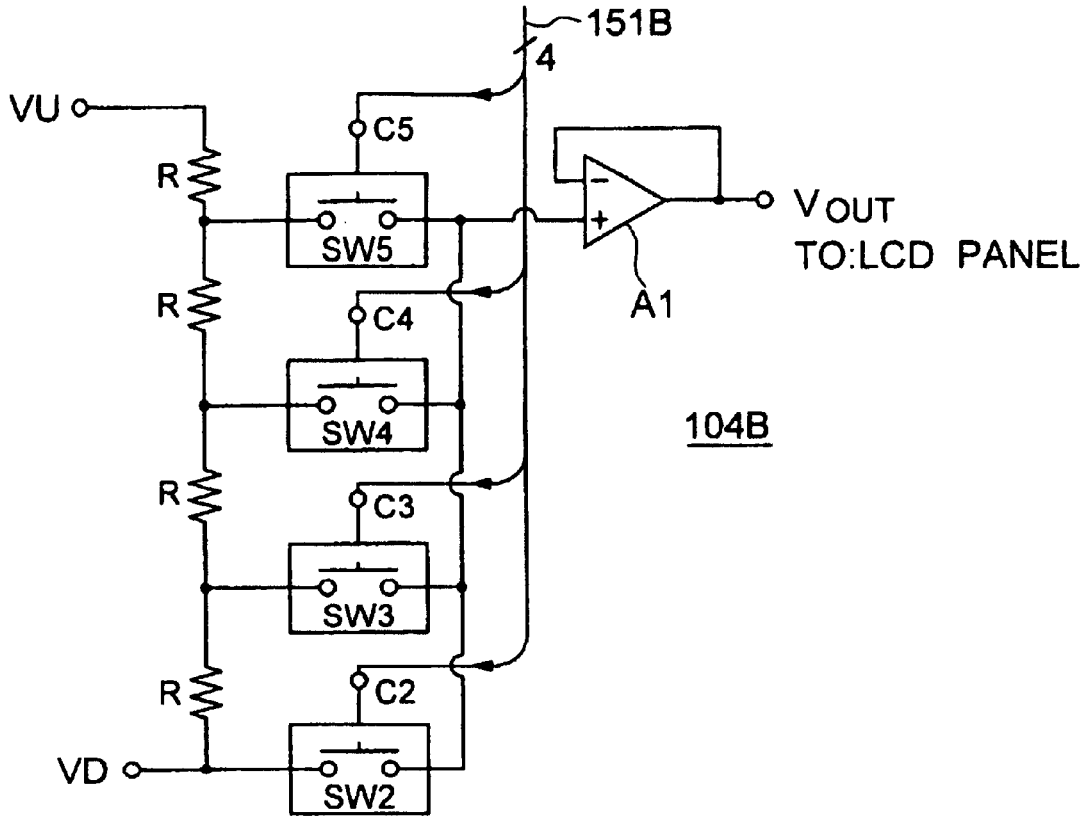
FIG. 13 is a block diagram illustrating the configuration of the output stage amplifier block 104B shown in FIG. 11.

As shown in FIG. 13, the output stage amplifier block 104B includes four resistors for dividing the voltage between $V_U$ and $V_D$, switches SW2 to SW5 for selecting a voltage at any one of the tap points of the resistors or the voltage $V_D$, and a buffer amplifier A1 for reducing the output impedance of the switches SW2 to SW5. The switches SW2 to SW5 are controlled by the control signal 151B that is output from the least-significant-bit controller 103B.

When the control signal 151 B selects the switch SW2, the voltage $V_{OUT}$ becomes equal to the voltage $V_D$. When the control signal 151B selects the switch SW3, the voltage $V_{OUT}$ becomes equal to $(3/4)V_D+(1/4)V_U$. When the control signal 151B selects the switch SW4, the voltage $V_{OUT}$ becomes equal to $(2/4)V_D+(2/4)V_U$. When the control signal 151B selects the switch SW4, the voltage $V_{OUT}$ becomes equal to $(1/4)V_D+(3/4)V_U$.

Figure 14:
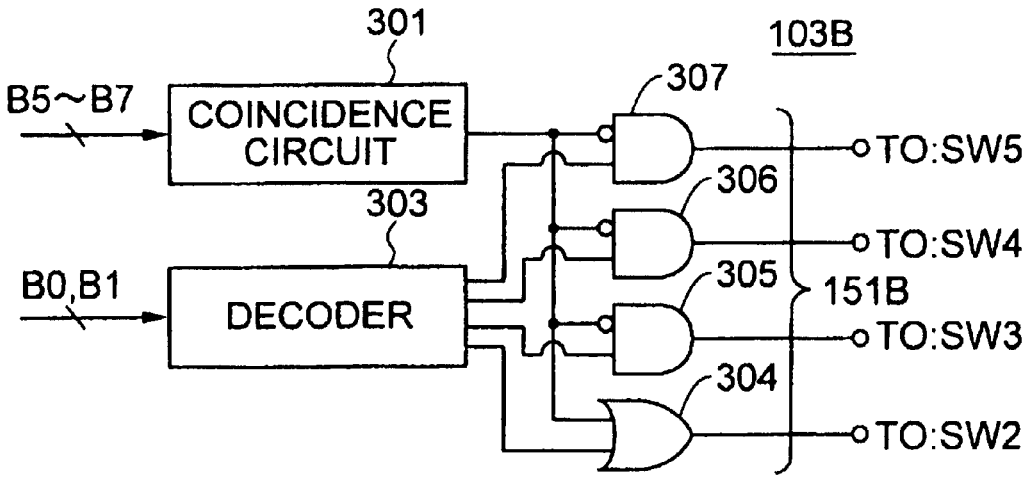
FIG. 14 is a block diagram illustrating the configuration of the least-significant-bit controller 103B shown in FIG. 11.
Figure 15:
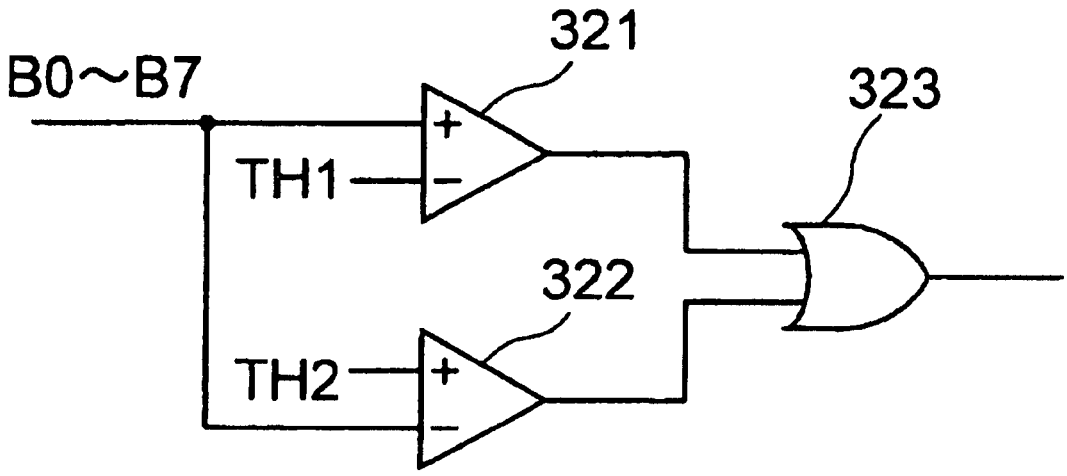
FIG. 15 is a circuit diagram illustrating the configuration of a circuit that can be employed in place of a coincidence circuit 301.

As shown in FIG. 14, the least-significant-bit controller 103B includes a coincidence circuit 301, a 2-to-4 line decoder 303, an OR gate 304, and AND gates 305 to 307. The output terminal of the OR gate 304 is connected to a control terminal C2 of the switch SW2. The output terminal of the AND gate 305 is connected to a control terminal C3 of the switch SW3. The output terminal of the AND gate 306 is connected to a control terminal C4 of the switch SW4. The output terminal of the AND gate 307 is connected to a control terminal C5 of the switch SW5.

As can be seen clearly from FIG. 14, when all the values of the three significant bits B5–B7 of video data assume "0" or "1", the coincidence circuit 301 outputs a high level signal, thereby causing the OR gate 304 to output a high level signal and the AND gates 305–307 to output a low level signal. Therefore, at this time, of the switches SW2 to SW5, only the switch SW2 is turned on. On the other hand, when any one of the three significant bits B5–B7 of the video data assumes a value different from the values of other two significant bits, the coincidence circuit 301 outputs a low level signal. Then, the OR gate 304 and the AND gates 305–307 output a low level or a high level control signal 151B depending on the value of the less significant two bits B0 and B1. Therefore, at this time, in accordance with the value of the less significant two bits B0 and B1 of the video data, one of the switches SW2 to SW5 is turned on and other switches are turned off.

Therefore, as shown in FIG. 12, the value of the output voltage $V_{OUT}$ that is provided from the output stage amplifier block 104B varies depending on the value of video data. That is, for the magnitude of digital video data residing within the range of 0 to 31, the output voltage $V_{OUT}$ assumes V0, V1, V2, . . . and V31. For the magnitudes of digital video data residing within the range of 32 to 223, the output voltage $V_{OUT}$ assumes V32, $(3/4)$V32+$(1/4)$V36, $(2/4)$V32+$(2/4)$V36, $(1/4)$V32+$(3/4)$V36, V36, . . . V220, $(3/4)$V220+$(1/4)$V224, $(2/4)$V220+$(2/4)$V224, and $(1/4)$V220+$(3/4)$V224. For the magnitude of digital video data residing within the range of 224 to 255, the output voltage $V_{OUT}$ assumes V224, V225, V226, . . . and V255.

Other examples of the output circuit that can be incorporated into the output stage amplifier block include a D/A converter that can generate, from a plurality of reference voltages, a plurality of voltages greater in number than the reference voltages such as by a switched capacitor method employing capacitors or a R-2R method employing resistors.

It is to be noted that, in the first and second embodiments, the least-significant-bit controller 103A or 103B determines whether or not a gray-scale voltage to be displayed is within a linear region, using the coincidence circuit 301 to determine whether or not all the three significant bits of video data coincide with each other. The present invention, however, is not limed thereto. For example, as shown in FIG.

15, instead of the coincidence circuit 301, it is possible to employ a circuit including two comparators 321 and 322 and an OR gate 323 for receiving the outputs of these comparators in order to set given threshold values TH1 and TH2 indicative of the boundary between the linear and nonlinear regions.

It is also possible to combine the following components in order to further reduce the scale of the gray-scale voltage selector block. That is, (1) The gray-scale voltage selector block 102A, (2) A decoder that replaces the 2-to-4 line decoder 303 to provide one to four high level outputs in accordance with the value of the bits B0 and B1, and the OR gate 304 or the least-significant-bit controller 103B with the output thereof eliminated, and (3) The switch SW1, and the output stage amplifier block 104A having three pairs of transistors, the gates of which are connected to the switch SW1.

As described above, according to the preferred embodiments of the present invention, in the linear region of characteristic of liquid crystal transmittance with respect to applied voltage, the gray-scale voltage selector block selects one or two voltages in accordance with the value of the significant bits of video data. By using the selected voltages, further divided voltages are generated in accordance with the value of the remaining less significant bits of all the bits of the video data. This makes it possible to significantly reduce the scale of the gray-scale voltage selector block. On the other hand, in the nonlinear region of characteristic of liquid crystal transmittance with respect to applied voltage, a difference between gray-sale voltages (a difference in voltage to obtain the same difference in gray scale) is greater than in the linear region and not even. However, the nonlinear region is determined in accordance with part of the significant bits to generate and then select gray-scale voltages with an 8-bit accuracy. Thus, this makes it possible to display, on a liquid crystal display panel, an image with properly expressed levels of gray scale. It is also possible to implement, for example, a full-color display of 16,770,000 colors by using a liquid crystal panel of three primary colors and three drive circuit systems when employed accordingly.

Furthermore, according to the embodiments, the scale of the gray-scale voltage selector block can be reduced. Even with an increase in scale of the output circuit, it is possible to reduce the entire scale of the drive circuit.

The conventional 8-bit resistor string method requires that the gray-scale voltage selector blocks be provided per one output with a decoder complaint with 256 levels of gray scale and 256 switches. In contrast, the first embodiment requires that the gray-scale voltage selector blocks be provided per one output only with a decoder compliant with 160 levels of gray scale and 160 switches. Furthermore, the second embodiment requires that the gray-scale voltage selector blocks be provided per one output only with two sets of a decoder complaint with 112 levels of gray scale and 112 switches.

With the reduced number of gray scale levels to be output by the gray-scale voltage selector blocks, the number of gray scale levels to be tested is also reduced. This makes it possible to carry out the test of the chip in a shorter time and thereby reduce the cost of the chip. It is not necessary to test the output circuit on all levels of gray scale, and instead, it is sufficient to test all the combinations of the control signals.

Since the above embodiments are described only for examples, the present invention is not limited to the above embodiments and various modifications or alternations can be easily made therefrom by those skilled in the art without departing from the scope of the present invention.

What is claimed is:

1. A drive circuit for driving a display unit comprising:

a gray-scale level voltage generator for generating a plurality of gray-scale level voltages, said gray-scale voltages corresponding to magnitudes of possible video data in one-to-one correspondence in a non-linear region of characteristic of liquid crystal transmittance and corresponding to magnitudes of possible video data in one-to-n correspondence in a linear region of characteristic of liquid crystal transmittance where n is an integer larger than one;

a gray-scale voltage selector block for responding to input video data to select one of said gray-scale level voltages;

a judgement section for judging whether a magnitude of an input video data resides within the non-linear region or the linear region to output a judgement signal indicating the non-liner region or the linear region; and an output circuit for responding to said judgement signal to output said one of said gray-scale level voltages selected by said gray-scale voltage selector block when said judgment signal indicates the non-linear region and output one of said gray-scale voltages or an intermediate voltage when said judgement signal indicates the linear region, the intermediate voltage residing between two of adjacent gray-scale voltages.

2. The drive circuit as defined in claim 1, wherein given n is two.

3. The drive circuit as defined in claim 1, wherein said output circuit includes a modified voltage follower for generating one of said gray-scale voltages or an adjacent intermediate voltage, said modified voltage follower being controlled to equalize the input and output thereof or to differentiate the input and the output thereof by a specified voltage.

4. The drive circuit as defined in claim 1, wherein said judgement circuit includes a coincidence circuit for judging whether or not a plurality of significant bits of the video signal coincides.

5. The drive circuit as defined in claim 1, wherein given n is four.

6. The drive circuit as defined in claim 5, wherein said output circuit includes an interpolation circuit for generating a plurality of intermediate voltages between adjacent two of said gray-scale voltages.

7. The drive circuit as defined in claim 6, wherein said interpolation circuit includes a resistor string.

8. The drive circuit as defined in claim 5, wherein said judgement circuit includes a coincidence circuit for judging whether or not a plurality of significant bits of the video signal coincide with one another.

*9. A driver for driving a display in response to a plurality of input data, each of said input data comprising a plurality of bits, said driving circuit comprising:*

*a gray shade voltage generation circuit generating a plurality of gray shade voltages, the number of said gray shade voltages being determined by the number of said bits of said input data, said gray shade voltages being divided into first and second groups of gray shade voltages, said first group of gray shade voltages being generated by a resistance string circuit and said second group of gray shade voltages being generated based on at least two different ones of first group of gray shade voltages;*

*a plurality of output terminals coupled to said display device; and*

*a plurality of selector circuits, each of said selector circuits selecting one of said gray shade voltages in response to information of an associated one of said input data, said one of said gray shade voltages being supplied to an associated one of said output terminals.*

*10. The driver as claimed in claim 9, further comprising at least two resistors for voltage dividing by using selected two voltages from first group of gray shade voltages to produce said second group of gray shade voltages.*

*11. The driver as claimed in claim 10, wherein said selector selecting an associated one of said first group of gray shade voltages when said display device is driven with a first input data corresponding to a non-linear region of characteristic of liquid transmittance, selecting an associated one of said first group of gray shade voltages when said display device is driven with a second input data corresponding to a linear region of characteristic of liquid transmittance, selecting an associated one of said second group of gray shade voltages when said display device is driven with a third input data corresponding to said linear region of characteristic of liquid transmittance.*

*12. A driver for driving a display device, comprising:*

*a gray shade voltage generating circuit having a resistor string, said resistor string having a first portion producing a first group of gray shade voltages, said resistor string having a second portion producing a second group of gray shade voltages, said resistor string having a third portion between said first and second portions producing a third group of gray shade voltages;*

*a selector selecting an associated one of said first and third groups of gray shade voltages when said display device is driven with a first input data corresponding to said non-linear region of characteristic of liquid transmittance, selecting an associated one of said third group of gray shade voltages when said display device is driven with a second input data corresponding to a linear region of characteristic of liquid transmittance, selecting a gray shade voltage produced from associated two ones of said third group of gray shade voltages when said display device is driven with a third input data corresponding to said linear region of characteristic of liquid transmittance; and*

*an amplifier amplifying a gray shade voltage outputted from said selector to apply the amplified gray shade voltage to said display device.*

*13. The driver as claimed in claim 12, said selector including at least two resistors to perform a voltage dividing by using adjacent two gray shade voltages to generate said gray shade voltage produced from associated two ones.*

* * * * *